(12) United States Patent
Bianchi et al.

(10) Patent No.: US 9,500,301 B2
(45) Date of Patent: Nov. 22, 2016

(54) METHOD AND VESSEL FOR LAYING A PIPELINE

(71) Applicant: SAIPEM S.p.A., Milan (IT)

(72) Inventors: Stefano Bianchi, Cernusco sul Naviglio (IT); Roberto Bruschi, San Donato Milanese (IT); Diego Lazzarin, Treviso (IT)

(73) Assignee: SAIPEM S.P.A., Milan (IT)

( * ) Notice: Subject to any disclaimer, the term of this patent is extended or adjusted under 35 U.S.C. 154(b) by 113 days.

(21) Appl. No.: 14/363,529

(22) PCT Filed: Dec. 7, 2012

(86) PCT No.: PCT/EP2012/074805
§ 371 (c)(1),
(2) Date: Jun. 6, 2014

(87) PCT Pub. No.: WO2013/083780
PCT Pub. Date: Jun. 13, 2013

(65) Prior Publication Data
US 2014/0321920 A1 Oct. 30, 2014

(30) Foreign Application Priority Data
Dec. 8, 2011 (GB) .................................... 1121118.2

(51) Int. Cl.
*F16L 1/18* (2006.01)
*B63B 35/03* (2006.01)
*F16L 1/225* (2006.01)

(52) U.S. Cl.
CPC .................. *F16L 1/18* (2013.01); *B63B 35/03* (2013.01); *F16L 1/225* (2013.01)

(58) Field of Classification Search
CPC .......... B63B 35/03; B63B 35/04; F16L 1/12; F16L 1/16; F16L 1/18; F16L 1/225
See application file for complete search history.

(56) References Cited

U.S. PATENT DOCUMENTS 3,438,213 A 4/1969 Broussard et al.
3,517,519 A 6/1970 Kolb et al.
(Continued)

FOREIGN PATENT DOCUMENTS

CN 101626948 1/2010
CN 101715408 5/2010
(Continued)

OTHER PUBLICATIONS

International Search Report (PCT/ISA/210) mailed on Apr. 26, 2013, by the European Patent Office as the International Searching Authority for International Application No. PCT/EP2012/074805.
(Continued)

*Primary Examiner* — Matthew R Buck
*Assistant Examiner* — Aaron Lembo
(74) *Attorney, Agent, or Firm* — Buchanan Ingersoll & Rooney PC (57) ABSTRACT

A stinger extends away from an end of a vessel, and a pipeline passes over the stinger as the pipeline is laid from the vessel. The inclination of the pipeline increases as the pipeline passes along the stinger and after leaving the stinger until the pipeline reaches an inflection point beyond the end of the stinger at which inclination is at a maximum. Inclination of the pipeline thereafter reduces until the pipeline touches down on the seabed. A method of S-laying the pipeline includes providing guides on the stinger that limit lateral movement of the pipeline relative to the stinger and moving the vessel and the stinger during S-laying to an orientation in which the longitudinal axis of the stinger is inclined to the path of the pipeline just laid. The vessel and the stinger are rotated about a vertical axis passing through or adjacent to the inflection point.

24 Claims, 6 Drawing Sheets

(56) References Cited

U.S. PATENT DOCUMENTS

| | | | |
|---|---|---|---|
| 3,546,888 A * | 12/1970 | Broussard et al. | 405/166 |
| 3,641,779 A | 2/1972 | Koop, Jr. et al. | |
| 3,670,511 A | 6/1972 | Gibson et al. | |
| 3,685,305 A | 8/1972 | Lloyd, III | |
| 3,901,043 A | 8/1975 | Silvestri et al. | |
| 4,127,006 A | 11/1978 | Oosterkamp | |
| 4,257,718 A | 3/1981 | Rosa et al. | |
| 4,472,079 A | 9/1984 | Langner | |
| 5,533,834 A | 7/1996 | Recalde | |
| 6,364,573 B1 | 4/2002 | Baugh | |
| 6,524,030 B1 * | 2/2003 | Giovannini et al. | 405/166 |
| 7,189,028 B1 * | 3/2007 | Signaroldi et al. | 405/166 |
| 2004/0062611 A1 * | 4/2004 | Endal | 405/168.1 |
| 2007/0098504 A1 | 5/2007 | Roodenburg et al. | |
| 2009/0087267 A1 | 4/2009 | Narold et al. | |
| 2010/0080657 A1 * | 4/2010 | Bianchi | 405/168.3 |
| 2010/0086360 A1 * | 4/2010 | Signaroldi | 405/166 |
| 2010/0158613 A1 * | 6/2010 | Bereznitski et al. | 405/166 |
| 2010/0189513 A1 * | 7/2010 | Alloggio | 405/166 |
| 2011/0052324 A1 * | 3/2011 | Bruschi et al. | 405/166 |
| 2011/0081204 A1 * | 4/2011 | van Grieken et al. | 405/167 |
| 2011/0103894 A1 * | 5/2011 | Feijen et al. | 405/166 |
| 2011/0123273 A1 * | 5/2011 | Feijen et al. | 405/166 |
| 2011/0274518 A1 * | 11/2011 | Pose | 414/139.4 |
| 2013/0017019 A1 * | 1/2013 | Bianchi et al. | 405/166 |
| 2013/0034389 A1 | 2/2013 | Lazzarin et al. | |
| 2013/0084135 A1 | 4/2013 | Cruickshank | |
| 2013/0279989 A1 * | 10/2013 | Baylot et al. | 405/156 |
| 2013/0294838 A1 * | 11/2013 | Bianchi et al. | 405/168.1 |
| 2014/0126962 A1 * | 5/2014 | Bianchi et al. | 405/170 |
| 2015/0037101 A1 * | 2/2015 | Bianchi et al. | 405/166 |

FOREIGN PATENT DOCUMENTS

| | | |
|---|---|---|
| EP | 1 063 163 A2 | 12/2000 |
| GB | 2477755 A | 8/2011 |
| IT | 1290470 B1 | 12/1998 |
| WO | WO 93/06401 A1 | 4/1993 |
| WO | WO 2007/094655 A1 | 8/2007 |
| WO | 2008/086938 A1 | 7/2008 |
| WO | 2008/107186 A1 | 9/2008 |
| WO | 2008/149210 A2 | 12/2008 |
| WO | 2009/134124 A2 | 11/2009 |
| WO | 2009/148297 A1 | 12/2009 |
| WO | 2010/052690 A2 | 5/2010 |
| WO | 2011/010207 A1 | 1/2011 |
| WO | WO 2011/086100 A2 | 7/2011 |

OTHER PUBLICATIONS

Written Opinion (PCT/ISA/237) mailed on Apr. 26, 2013, by the European Patent Office as the International Searching Authority for International Application No. PCT/EP2012/074805.

Official Action issued in corresponding Chinese Patent Application No. 201280060749.4, dated Dec. 25, 2015, with English language translation (26 pages).

* cited by examiner

METHOD AND VESSEL FOR LAYING A PIPELINE

BACKGROUND OF THE INVENTION

This invention relates to a method of laying a pipeline and to a pipelaying vessel. Such methods and vessels are of particular use in the offshore industry relating to oil and gas production.

One of the tasks that is carried out by certain vessels in the offshore industry is that of laying pipelines, either by S-laying or by J-laying.

In S-laying, the pipeline leaves the vessel at little or no inclination to the horizontal, adopts a steeper inclination in the water and then returns to a generally horizontal disposition on the seabed. The tension in the pipeline is often accommodated by a series of track tensioners mounted along the pipelaying path, on the vessel. The track tensioners support the weight of the pipeline and control passage of the pipeline. To allow S-laying a stinger may be provided, extending away from an end of the vessel with the pipeline passing over the stinger as it is laid from the vessel and increasing in its inclination to the horizontal as it passes along the stinger.

In J-laying, the pipeline leaves the vessel at a steep or vertical inclination and the inclination steadily reduces until the pipeline is in a generally horizontal disposition on the seabed. J-laying usually involves lowering a pipeline down a J-lay tower mounted on the vessel. The J-lay tower may be fixed and vertical or may be able to be inclined to the vertical. J-laying is used primarily for laying pipeline in deep water (that is typically deeper than 1,000 m).

A pipeline is laid on a seabed along a predetermined path with a certain tolerance allowed to either side of a centre line of the path. The area within the boundaries of the tolerance is commonly referred to as the "pipelaying corridor" or "laying corridor". Typically a pipelaying vessel on the surface of the sea is aligned above the centre of the pipelaying path and is propelled along that path by the vessel's propulsion system as the pipeline is laid. In the case of S-laying, the pipeline typically leaves the vessel in the region of its stern aligned with the longitudinal axis of the vessel and at a downward inclination to the horizontal. In the case of J-laying the pipeline typically leaves the J lay tower in a vertical direction or at a steep inclination to the horizontal.

In some circumstances, for example certain wave conditions, it becomes desirable for the orientation of the vessel to be adjusted such that its longitudinal axis is inclined to the pipelaying corridor, for example to allow it to face into oncoming waves. When that occurs, it may be necessary to cease pipelaying, but that is undesirable. When J laying, especially in the case where the pipeline leaves the J laying tower in a vertical or almost vertical direction, it becomes possible to rotate the vessel about the J laying tower to a chosen orientation with little or no change to the path followed by the pipeline from the vessel to the point at which it touches down on the seabed. Modern vessel propulsion systems are versatile and it is straightforward still to propel the vessel along a path over the pipelaying corridor, even though the vessel is facing in a direction inclined to that path. A procedure of this kind, which is known as weathervaning is for example described in WO2007/094655 and can be adopted without undue difficulty.

In the case of S-laying, however, the position is very different. The generally shallower inclination of the pipeline as it leaves the stinger makes any such weathervaning a much more challenging prospect. It is in principle possible to introduce a curvature of the stinger structure about a vertical axis to introduce bending of the pipeline about a vertical axis. There is, however, then still a problem that, if the orientation of the vessel is rotated to face in a direction inclined to the pipelaying path, then the path followed by the pipeline from the downstream end of the stinger to the point at which the pipeline touches down on the seabed inevitably changes substantially and becomes complex. Also the stinger has to accommodate lateral forces exerted by the pipeline. In WO 2007/094655, this problem is recognised and the solution proposed for S-laying is shown in FIG. 18 and is to provide a stinger of sufficient length and curvature that the pipeline reaches its position of maximum (near vertical) inclination (inflection point) before it has left a flared guide assembly provided at the downstream end of the stinger. In this way the last portion of the stinger is actually acting in a manner similar to a J-lay tower and so the vessel is able to weathervane in the same manner as might a vessel with a J-lay tower, with the vessel rotating about an axis passing through the flared guide assembly (equivalent to the J-lay tower) on the stinger. In that case, as in conventional J-laying, the path followed by the pipeline from the downstream end of the stinger to the point at which the pipeline touches down on the seabed is substantially unaffected. This arrangement avoids the problem referred to above with conventional S-laying but can only be employed in relatively deep water It is an object of the invention to provide an improved method of S-laying a pipeline and an improved pipelaying vessel for S-laying a pipeline.

SUMMARY OF THE INVENTION

The present invention provides, according to a first aspect, a method of S-laying a pipeline from a vessel in which a stinger extends away from an end of the vessel and the pipeline passes over the stinger as it is laid from the vessel, the inclination of the pipeline to the horizontal increasing as it passes along the stinger and after it leaves the stinger until it reaches an inflection point beyond the end of the stinger at which the inclination of the pipeline to the horizontal is at a maximum, the inclination of the pipeline thereafter reducing until it touches down on the seabed, the method including the following steps:

providing guides on the stinger that limit lateral movement of the pipeline relative to the stinger, moving the vessel and the stinger during S-laying to an orientation in which the longitudinal axis of the stinger is inclined to the path of the pipeline just laid on the seabed, wherein the step of moving the vessel and the stinger comprises rotating the vessel and the stinger about a vertical axis passing through or adjacent to the inflection point.

We have found that in order to keep stresses on the pipeline at a low level and continue to lay the pipeline along the laying corridor while moving to a weathervaning orientation of the vessel, the best approach is to rotate the vessel about an axis that passes through or adjacent to the inflection point of the pipeline. Thus according to the invention the vertical axis about which the vessel is rotated lies not only beyond the vessel but even beyond the stinger.

The vertical axis about which the vessel and the stinger are rotated most preferably passes through the inflection point of the pipeline. Typically the distal end of the stinger stays within the laying corridor. If the axis about which the vessel and stinger are rotated does not pass through the inflection point of the pipeline it preferably passes within 10 m, more preferably within 5 m, and most preferably within 2 m, of the inflection point. Also the vertical axis about which the vessel and the stinger are rotated most preferably passes closer to the inflection point than to the end of the stinger. Preferably the vertical rotation axis stays within the laying corridor.

The invention may be adopted with a variety of stinger arrangements. For example, in a preferred embodiment of the invention described below, as viewed from above, the orientation of the stinger relative to the vessel in the region of the connection of the stinger to the vessel is fixed, but it is within the scope of the invention for that orientation to be adjustable. Also, in the preferred embodiment described below, the inclination of the stinger relative to the vessel in the region of the connection of the stinger to the vessel is adjustable, but it is within the scope of the invention for that inclination to be fixed. The stinger preferably comprises a series of sections pivotally connected to one another. In the preferred embodiment described below the sections are pivotally about a horizontal axis but are fixed against pivoting about a vertical axis.

Preferably a downstream end portion of the stinger is able to be moved between an active position in which it guides the pipeline and a passive position in which it does not interact with the pipeline. The downstream end portion may, for example, be able to be pivoted downwardly into the passive position. In a case where the stinger comprises a series of sections pivotally connected to one another, the downstream end portion of the stinger may comprise a final pivotally connected section of the stinger. The downstream end portion of the stinger may be placed in its active position during weathervaning. The movement of the downstream end portion of the stinger from its passive position to its active position may be controllable remotely from the vessel during laying of a pipeline.

When laying the pipeline a laying corridor may be defined on the seabed, the corridor being of finite width and defining the acceptable limits of the path of the pipeline laid on the seabed by the vessel. During conventional pipelaying the vessel is positioned above the middle of the laying corridor, but in the present invention, when the vessel is weathervaning, the method may include laying pipeline while the vessel is entirely outside the laying corridor, as viewed from above. Such an approach is opposite to conventional methods in which it is commonly regarded as important that the vessel remain over the laying corridor when it is laying pipe. In a case where the vessel is entirely outside the laying corridor, as viewed from above, it is usually preferred that the downstream end of the stinger is inside the laying corridor, as viewed from above.

During weathervaning the vessel and the stinger are moved to an orientation in which, as viewed from above, the longitudinal axis of the stinger is inclined to the path of the pipeline just laid on the seabed. The preferred angle of inclination is dependent upon the sea conditions but, if required, may be more than 20 degrees and in some cases more than 35 degrees. In an embodiment of the invention described below angles of inclination of the stinger to the path of the pipeline of 45 degrees are able to be accommodated. The vessel can continue to be driven along the pipelaying corridor by its propulsion system, which may typically be a dynamic positioning (DP) system. Such systems are known per se and are able to propel the vessel in a direction inclined to its longitudinal axis.

Each guide for limiting lateral movement of the pipeline preferably extends on one side or another of the pipeline and defines a lateral guide. Each lateral guide preferably comprises a roller mounted for rotation about an axis disposed in a respective vertical plane and substantially perpendicular to the pipelaying path in the vicinity of the roller. The axis of rotation of the roller may be adjustable during laying of the pipeline but for simplicity it is preferably fixed during laying. It is however preferred that the axis can be adjusted laterally prior to laying of the pipeline. That provides a more versatile arrangement.

The lateral guides are preferably in a series of pairs along the stinger, at least some of the pairs of guides being laterally spaced apart by a distance greater than the diameter of the pipeline with the spacing increasing towards the downstream end of the stinger; the guides may be provided with a resilient covering. A pair of guides is preferably provided, upstream of other guides, for guiding the pipeline along a central portion of the stinger before it moves to a position offset from the central portion of the stinger. Other arrangements of pairs of guides are within the scope of the invention; for example a pair of guides may be spaced apart by approximately the diameter of the pipeline but may be movable laterally to cause or accommodate lateral bending of the pipeline. That movement may be a driven movement, for example by hydraulics, or it may be resiliently resisted or not resisted at all at least across most of the range of movement. As will be understood from the comments above, during weathervaning the pipeline, as viewed from above, preferably curves as it passes along the stinger and leaves the stinger at an inclination to the longitudinal axis of a downstream end portion of the stinger, as viewed from above; also it preferably leaves the stinger at a position laterally offset from the central portion of the downstream end portion of the stinger, as viewed from above.

Guide rollers are also preferably provided along the stinger below the pipeline for supporting the pipeline as it travels along the stinger. Preferably the pipeline is not restrained from moving upwardly in a direction away from the stinger, at least along the downstream end of the stinger; accordingly, there are preferably no restraints provided above the pipeline and the stinger is open on its upper side. Preferably, as the pipeline passes along the stinger, its downward and lateral movement are limited by the stinger but it is not restrained by the stinger from moving upwardly relative to the stinger. That allows the pipeline to move upwardly away from the stinger, if desired, and allows the stinger, or at least a downstream section of the stinger, to be moved downwardly away from the pipeline, if desired.

According to the first aspect of the invention there is also provided a pipelaying vessel assembly for S-laying a pipeline, the assembly comprising:

a vessel;

a stinger extending away from an end of the vessel for guiding the pipeline as it is laid from the vessel, the stinger being arranged to define a pipelaying path that increases in inclination to the horizontal towards its downstream end but which does not reach a vertical orientation, such that when, in use, a pipeline is laid from the vessel, the inclination of the pipeline to the horizontal increases as it passes along the stinger and after it leaves the stinger until it reaches an inflection point beyond the end of the stinger at which the inclination of the pipeline to the horizontal is at a maximum, the inclination of the pipeline thereafter reducing until it touches down on the seabed;

lateral guides on the stinger for limiting lateral movement of the pipeline relative to the stinger;

propulsion means for propelling the vessel in a desired direction of translational and rotational movement; and a control system capable of detecting or calculating the inflection point of the pipeline and for moving the vessel and the stinger during S-laying to an orientation in which the longitudinal axis of the stinger is inclined to the path of the pipeline just laid on the seabed, wherein the control system is arranged to effect the movement by rotating the vessel and the stinger about a vertical axis passing through or adjacent to the inflection point.

The pipelaying vessel according to the first aspect of the invention may be in a form suitable for carrying out the method of the first aspect of the invention in any of the forms described above.

The stinger preferably comprises a series of sections that are pivotally adjustable relative to one another about a horizontal axis to alter the overall downward inclination of the stinger along its length but are fixed against pivotal movement about an axis in a vertical plane and perpendicular to the path of the pipeline in that region of the stinger. By providing such limited pivoting of the stinger sections it becomes possible to provide a robust and economical stinger which is especially suited to use when the vessel is weathervaning. It might be thought that, in order to allow weathervaning, it would be particularly desirable to allow the stinger itself to pivot or curve laterally, especially bearing in mind that any lateral force on the downstream end of a stinger will apply a substantial torque at the connection of the stinger to the vessel and at any intermediate pivot connections that allow only pivoting in a vertical plane. We have found, however, that it is feasible to provide a stinger and vessel able to resist such torques and that the construction can be kept much simpler by not providing for any lateral movement. We have found that an especially good solution is to provide a stinger which is itself restricted to movement in a vertical plane, and to allow the pipeline to follow a curved path on the stinger and occupy a position offset from a central portion of the stinger.

Accordingly, in a second aspect of the invention there is provided a pipelaying vessel assembly for S-laying a pipeline, the assembly comprising
  a vessel;
  a stinger extending away from an end of the vessel for guiding the pipeline as it is laid from the vessel, the stinger being arranged to define a pipelaying path that increases in inclination to the horizontal towards its downstream end but which does not reach a vertical orientation, such that when, in use, a pipeline is laid from the vessel, the inclination of the pipeline to the horizontal increases as it passes along the stinger, the stinger comprising a series of sections that are pivotally adjustable relative to one another about a horizontal axis to alter the overall downward inclination of the stinger along its length but are fixed against pivotal movement about an axis in a vertical plane and perpendicular to the path of the pipeline in that region of the stinger;
  lateral guides on one or more sections of the stinger for limiting lateral movement of the pipeline relative to the stinger but allowing the pipeline to move to a position on the stinger laterally offset from a central portion of the stinger; and
  propulsion means for propelling the vessel in a desired direction, the propulsion means being capable of propelling the vessel in a direction inclined to the longitudinal axis of the vessel during S-laying of a pipeline.

Preferably the stinger comprises three or more sections pivotally connected in series for rotation about respective horizontal axes.

Some lateral guides are preferably arranged to retain the pipeline in a central portion of the stinger along an upstream portion of the stinger and further lateral guides are arranged to allow the pipeline to move to a position on the stinger laterally offset from the central portion of the stinger along a downstream portion of the stinger.

The vessel and stinger may be of generally the same form as that described and claimed in WO2011/086100 in which the stinger is referred to as an "external ramp assembly" and each ramp corresponds to what is referred to above as a stinger section. The contents of that application are incorporated herein by reference. The invention of the present application may incorporate any of the features disclosed in that patent application. For example the mechanism for pivoting the ramps relative to one another and locking them in position may be as claimed in that application.

The invention further provides a method of laying a pipeline employing a pipelaying vessel assembly as defined above.

It will of course be appreciated that features described in relation to one aspect of the present invention may be incorporated into other aspects of the present invention. For example, the features of the first and second aspects of the invention can be combined and indeed are combined in a vessel embodying the invention and described below, and a method according to the invention may incorporate any of the features described with reference to the apparatus of the first or second aspects of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
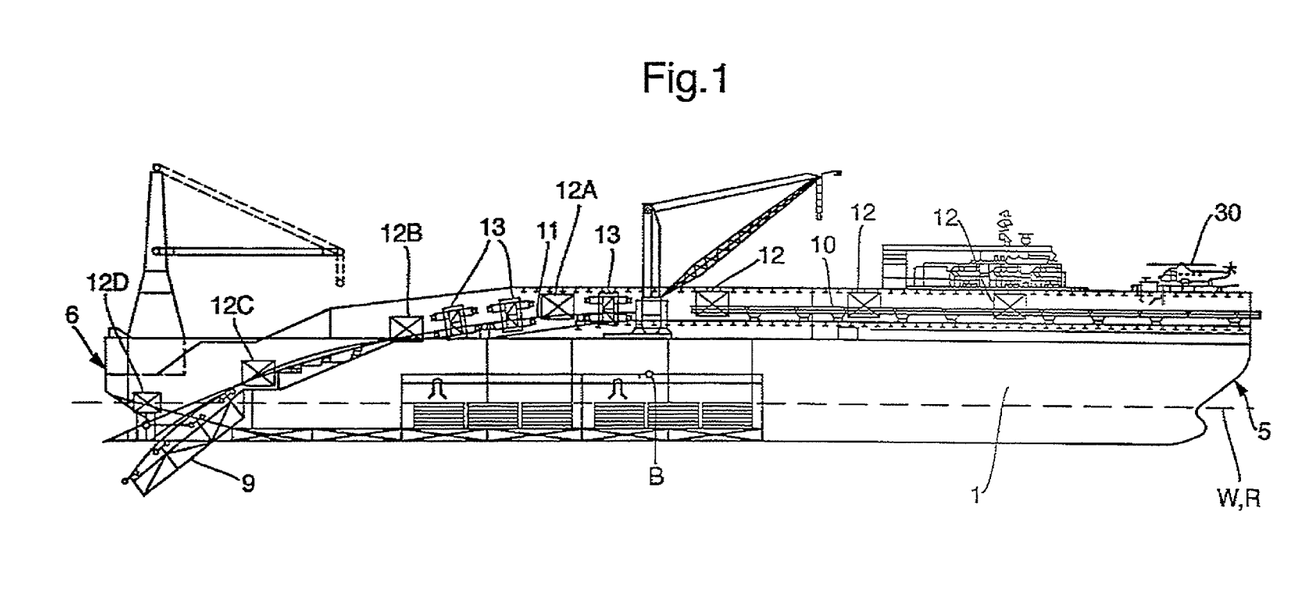
FIG. 1 is a partly sectional side view of a monohull vessel for laying a pipeline, the vessel including a single adjustable internal ramp assembly and not embodying the invention.

FIG. 1 is the same drawing as shown in WO 2008/107186 and reference can be had to that publication for further details of that vessel. Since, however, embodiments of the invention described below comprise modifications of the vessel shown in the drawings of WO 2008/107186 it is convenient to describe briefly the vessel shown in that publication the contents of which are incorporated herein by reference.

The vessel generally comprises a vessel hull 1, within which are defined a plurality of prefabricated decks for the prefabrication of jointed pipe sections from individual lengths of pipe and on which cranes and other facilities are provided. The bow 5 of the hull 1 is shown on the right hand side and the stern 6 of the hull 1 is shown on the left hand side, as viewed in FIG. 1.

The vessel hull 1 is of unconventional design at its stern end, having starboard and port end portions between which an elongate recess is defined. The recess is open at the stern end of the hull 1 and is also open downwardly (into the sea), but it may be closed over the top by a deck. In FIG. 1, an internal ramp 9 is shown pivotally connected to the hull of the vessel and is disposed in the protected stern area defined by the elongate recess at the stern end of the hull.

The barycentre B (centre of gravity) of the vessel is marked in FIG. 1, which also shows the water line W (the level of the sea when the vessel is at its working draught). The rolling axis R (the axis about which the vessel naturally rolls) is coincident with the waterline W.

Along the length of the middle of the vessel a pipelaying path (firing line) is defined. Ramps are provided along the path: at the upstream end (the right hand end as seen in FIG. 1) of the path, there is a horizontal, straight, fixed ramp 10; following that there is a curved, fixed, ramp 11 which extends between the fixed ramp 10 and the internal ramp 9. Thus the pipelaying path has an upstream horizontal section along the ramp 10 and leading to a curved section 11 that is of constant, fixed, curvature and which in turn leads to the downstream section along the internal ramp 9. The inclination of the ramp 9 relative to the vessel hull 1 can be adjusted and the ramp 9 is also provided with rollers which can be moved in a plane transverse to the pipelaying path to alter the curvature of the ramp 9. Thus at one extreme (suitable for laying in relatively shallow water), the portion of the pipelaying path along the internal ramp 9 may have only a small amount of curvature and the downward inclination of the path may be only slightly greater at the downstream end of the internal ramp 9 than at the downstream end of the curved ramp 11; at the other extreme (suitable for laying in relatively deep water) the pipelaying path along the internal ramp 9 may have a greater amount of curvature so that the downward inclination of the pipelaying path at the downstream end of the internal ramp 9 is substantially greater than the downward inclination of the path at the downstream end of the curved ramp 11. In FIG. 1, the ramp 9 is shown pivoted to a position suitable for substantially increasing the downward inclination of the pipelaying path.

Working stations in the form of welding stations 12 are provided along the fixed ramp 10 for welding new jointed sections of pipe to the end of the pipeline being laid. The active length of the horizontal, straight, portion of the pipelaying path extends from a distance corresponding to one jointed section of pipe upstream of the most upstream welding station 12 (the one furthest to the right in FIG. 1) to the upstream end of the curved ramp 11. The extended length of the horizontal, straight, portion of the pipelaying path extends further to the right (as seen in FIG. 1) to a location below the helicopter 30 shown in FIG. 1. Tensioners 13, of which three are shown in FIG. 1, are provided along the curved ramp 11 for tensioning the pipeline downstream of the tensioners. The precise form of the welding stations and tensioners is not relevant to the present invention and thus may take any known form. It may be noted that in FIG. 1 the tensioners 13 are shown as crawler track tensioners, but it should be understood that they may take other forms.

Downstream of the tensioners 13, the tension in the pipeline will cause it to follow the curvature of the ramps 11 and 9 so that only rollers below the pipeline are required. Upstream of one or more of the tensioners 13, however, where the pipelaying path first becomes curved that tension is hardly present and it may therefore be desirable to provide pressure rollers (not shown) above the pipeline to apply downward pressure onto the pipeline and cause it to follow the path defined by the curved ramp 11. Such pressure rollers can also assist in causing the pipeline to follow the path defined by the curved ramp 11 during abandonment/recovery operations.

In use of the vessel to lay a pipeline, the vessel is driven in a forwards direction by its propulsion system and, as is conventional for "S" laying of a pipeline, a considerable forward thrust is maintained, even when the vessel is not moving forwards, to balance the rearward force exerted on the vessel by the tension in the pipeline. The vessel is preferably equipped with a dynamic positioning system to maintain its desired position at all times. The pipeline is passed rearwardly over the vessel along the pipelaying path with the tensioners 13 controlling the passage of the pipeline. As the end of the pipeline moves along the horizontal fixed ramp 10, new jointed sections of pipe are welded to the end of the pipeline. As the pipeline reaches the curved ramp 11, the pressure rollers above the pipeline cause the pipeline to curve downwardly following the path of the curved ramp 11 and passing through the tensioners 13. The tension in the pipeline increases as it passes through the tensioners 13 reaching full tension after the last tensioner. The pipeline moves away from the vessel hull 1 as it passes from the curved ramp 11 onto the internal ramp 9 and, soon after passing onto the internal ramp 9 enters the water. As can be seen from FIG. 1, the point of entry of the pipeline into the water is within the protected stern area defined by the elongate recess in that area. The pipeline then passes to the end of the internal ramp 9, leaves the internal ramp 9 and passes down to the seabed. Usually, the forward thrust maintained by the vessel will be such that the pipeline is substantially straight and tangential to the end of the curved path defined by the ramp 9 in the region immediately downstream of the internal ramp 9 before then reducing in inclination as it approaches the seabed. In that way any sharp curvature at the end of the internal ramp 9 is avoided.

If the vessel is required to operate in deep water, then it may be desirable to add a further ramp and/or stinger downstream of the internal ramp 9 in order to provide further controlled curvature to the pipeline. In this specification, there is no particular distinction made between the use of the terms "ramp" and "stinger" and thus no particular construction of any further ramp is implied by choosing to call it a "ramp" rather than a "stinger".

In WO2011/086100 referred to above and incorporated herein by reference, an external ramp assembly or stinger that may be employed on the vessel shown in FIG. 1 of this specification is described, especially with reference to FIGS. 6 to 9c. That external ramp assembly or stinger comprises two ramps pivotally connected in series and connected at their upstream end to a pivotally mounted ramp 62 which corresponds to the ramp 9 in FIG. 1. For ease of reference, FIG. 6 of WO 2011/086100 is reproduced in this specification as FIG. 2 and shows in dotted outline the stern portion of a hull 61 of the pipelaying vessel already described with reference to FIG. 1.

At the stern of the vessel the ramp 62 is provided for guiding a pipeline as it leaves the vessel. In the example shown the ramp 62 is pivotally mounted at its upstream end 63 and the inclination of the ramp 62 can be adjusted by raising or lowering, relative to the vessel hull 61, a pair of connecting struts 64 (only one of which is visible in FIG. 2) to cause pivoting movement of the ramp 62.

An external ramp assembly or stinger 66 is pivotally connected to the downstream end 67 of the ramp 62 and extends to a free end. The external ramp assembly includes a first ramp 68 and a second ramp 69. Each of the first and second ramps has a framework structure, the framework including a pair of upper longitudinal members 70 (only one of which is visible in FIG. 2) on opposite sides of the ramp, a lower longitudinal member 71 along the bottom of each ramp and frame members 75 extending between the members 70 and 71 to provide a strong framework. The upper longitudinal members 70 of the ramps 68 and 69 are pivotally connected together at connections 72 and their lower longitudinal members 71 are connected together by a linkage 74 of adjustable length. As can readily be seen from FIG. 2, adjusting the length of the linkage 74 causes the ramps 68 and 69 to pivot relative to one another.

The inclination of the ramp 68 can be adjusted by raising or lowering, relative to the vessel hull 61, a pair of connecting struts 76 (only one of which is visible in FIG. 2) to cause pivoting movement of the ramp 68 relative to the ramp 62.

Figure 2:
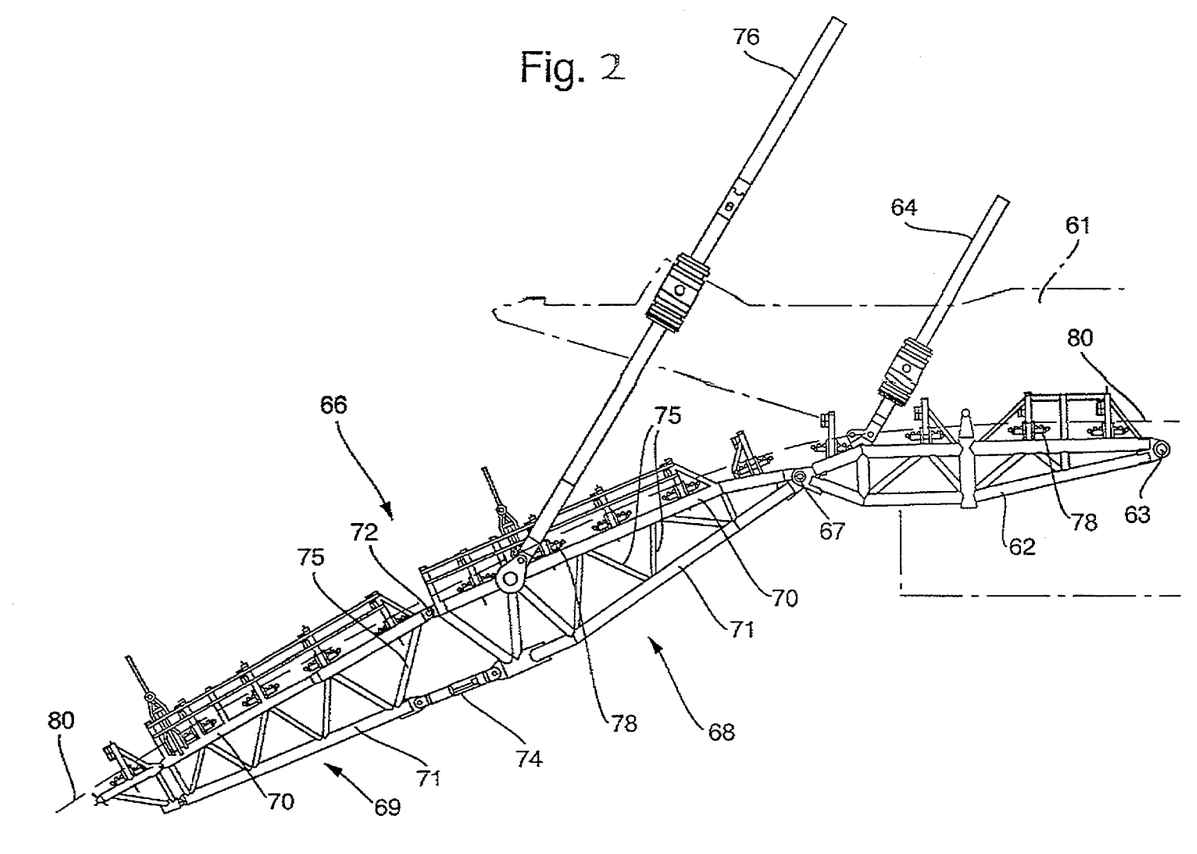
FIG. 2 is a side view of an external ramp assembly or stinger supported from the vessel of FIG. 1, the vessel not embodying the invention.

The ramps are each provided with sets of guide rollers 78 over which a pipeline is guided when in use the vessel is laying a pipeline. The guide rollers may be in fixed positions on the ramps or their positions may be adjustable to provide a further facility for adjusting the path along which the pipeline travels as it is being laid. In FIG. 2 a dotted line 80 shows a path along which the pipeline passes.

The purpose of the ramps 68 and 69 is to guide the pipeline to a chosen inclination as it leaves the downstream end of the ramp 69. In different conditions that inclination is often different. The provision of the linkage 74 enables the relative orientation of the ramps 68 and 69 to be adjusted relative to one another by adjusting the length of that linkage to cause pivoting of the ramps relative to one another, about their pivotal connection 72.

As described in the specification of WO 2011/086100, the linkage 74 is a telescopic linkage whose length can be adjusted hydraulically during operation of the vessel and once adjusted can be locked in position by interengaging formations on the telescoping members.

Figure 3:
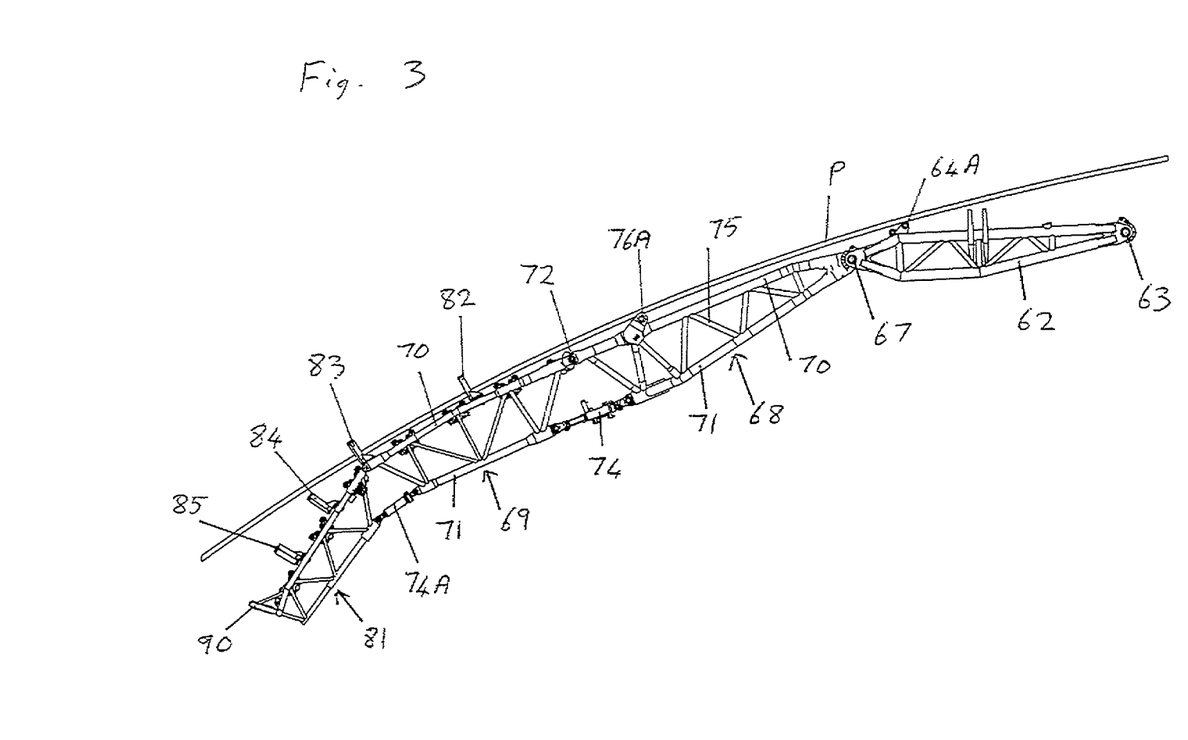
FIG. 3 is a side view of a stinger for use in an embodiment of the invention, the stinger being arranged for use in relatively shallow water.

FIG. 3 shows a stinger according to the invention which is in many respects of similar form to the stinger shown in FIG. 2 with corresponding parts referenced by the same reference numerals as in FIG. 2. It may be noted that the pairs of connecting struts 64 and 76 are not shown in FIG. 3 but the padeyes to which the struts are connected are shown and referenced 64A and 76A. Also shown in FIG. 3 is a pipeline P passing along the stinger.

The stinger shown in FIG. 3 differs from that of FIG. 2 in that an additional ramp 81 is pivotally connected at pivots 80 to the downstream end of the ramp 69 and can be pivoted thereto by a linkage 74A of adjustable length and which may be of the same form as the linkage 74 connected between the ramps 68 and 69 and described more fully in FIGS. 8 and 9A to 9C of WO 2011/086100 or may be of conventional construction. In FIG. 3 the stinger is shown in a typical arrangement for laying pipeline in relatively shallow water and the additional ramp 81 is shown pivoted downwardly relative to the ramp 69 to a position where it is inoperative.

The pivotal connections of the various ramps to one another all allow pivoting movement about a horizontal axis extending perpendicular to the length of the stinger, but they do not allow the ramps to move relative to one another in any other direction. In particular lateral or sideways movement of one ramp relative to another is not allowed.

In accordance with the present invention, the stinger shown in FIG. 3 also differs from the stinger of WO 2011/086100 in that the ramps 69 and 81 are provided with a series of lateral guide roller assemblies. More particularly the ramp 69 is provided towards its downstream end with a pair of lateral guide roller assemblies 82 and at its downstream end with a further pair of lateral guide roller assemblies 83, and the ramp 81 is provided towards its upstream end with a pair of lateral guide roller assemblies 84 and towards its downstream end with a pair of lateral guide roller assemblies 85. These four pairs of lateral guide roller assemblies are significant to embodiments of the present invention as will be described below.

Figure 4:
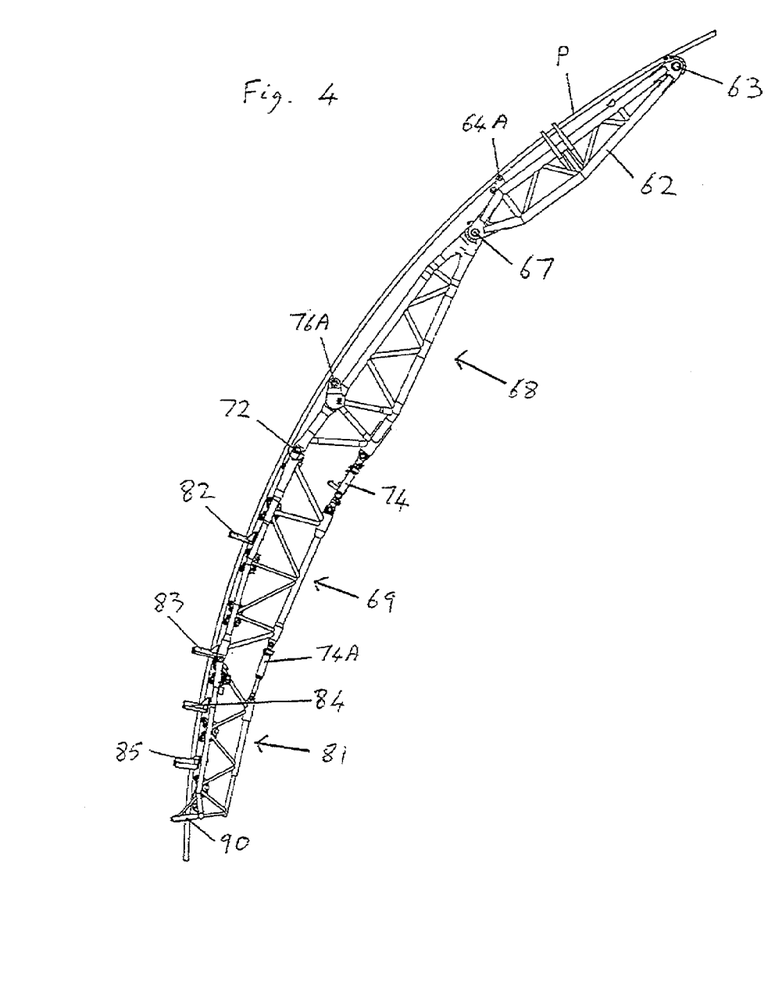
FIG. 4 is a side view of the stinger of FIG. 3, but arranged for use in relatively deep water.

FIG. 4 is a view similar to FIG. 3 but showing the stinger in a typical arrangement for laying pipeline in relatively deep water with the additional ramp 81 pivoted to a position much less downwardly inclined relative to the ramp 69 and therefore in an operative position in which it is also supporting and guiding the pipeline P.

Figure 5:
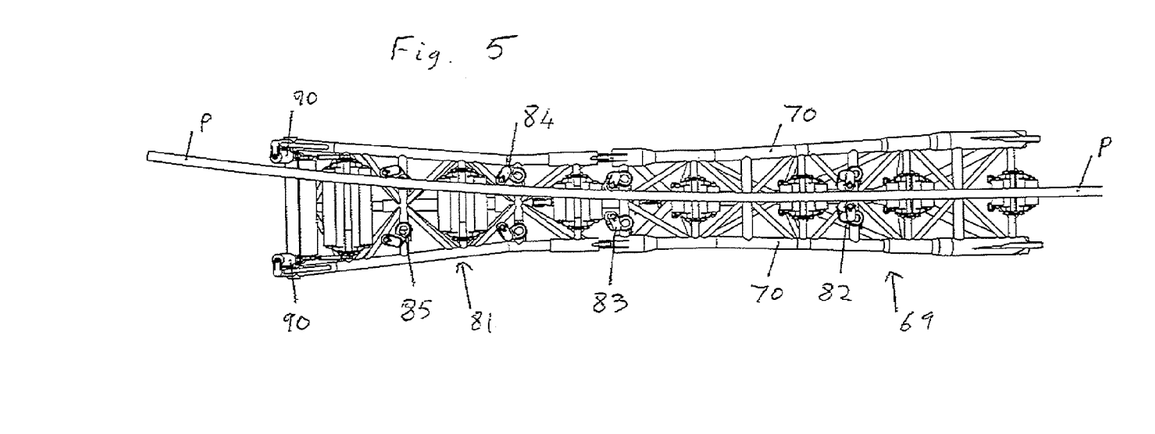
FIG. 5 is a plan view of the stinger of FIG. 3.

FIG. 5 is a view perpendicular to the ramps 69 and 81 when they are at only slight inclination to one another as shown in FIG. 4. It can be seen from FIG. 5 that the ramp 69 tapers inwardly towards its downstream end where it is connected to the ramp 81 which flares outwardly towards its downstream end.

Figure 6:
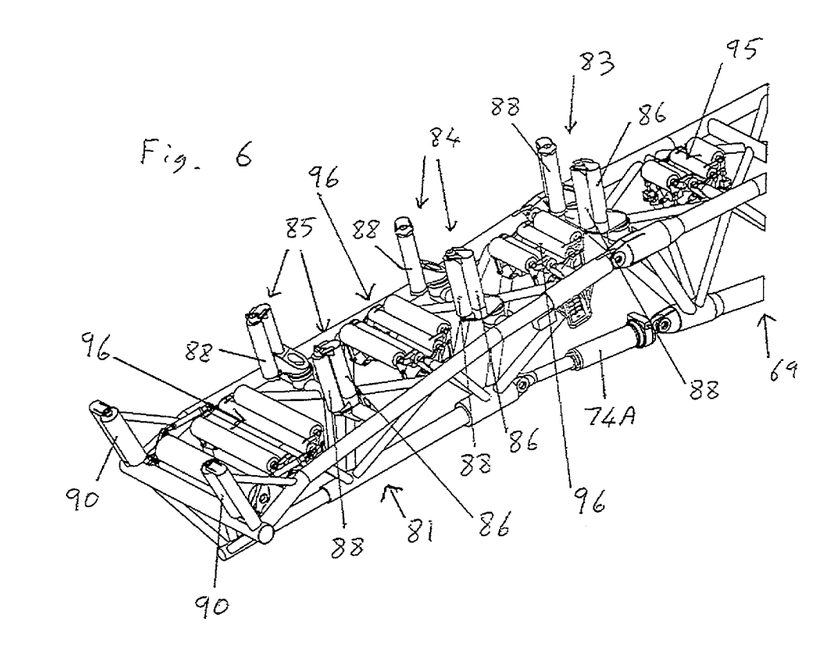
FIG. 6 is an isometric view of the downstream end of the stinger shown in FIGS. 3 to 5.

FIG. 6 is an isometric view of the downstream portion of the ramp 69 and the whole of the ramp 81. From this it can be seen that each of the pairs of roller assemblies 83, 84 and 85 are of the same construction. The roller assembly 82 (not visible in FIG. 6) is of the same construction as the assemblies 83, 84 and 85.

Each of the roller assemblies of assemblies 82, 83, 84 and 85 comprises an upstanding pillar 86 on one side of the ramp. The pillar 86 mounts a guide roller 88 which is rotatable about its longitudinal axis. The axis of rotation of the guide roller 88 is fixed once it has been selected but, by virtue of it being swivellably mounted on the pillar 86 for rotating about the pillar, the position of the fixed axis of rotation of each guide roller 88 is adjustable laterally of the stinger. The guide rollers 88 of a pair of roller assemblies can be arranged with their fixed axes spaced apart from a centreline of the stinger only by a spacing corresponding to the diameter of the pipeline being laid, as is the case for the rollers 82 in the positions shown in FIG. 5. In that case the pipeline is guided along a centreline of the stinger. The guide rollers 88 can, however, be arranged with their fixed axes of rotation spaced further apart from the centreline of the stinger to allow the pipeline to pass through a pair of guide rollers in contact with rollers on one side of the centreline of the stinger only. In that case the pipeline is guided along a path that diverges from the centreline of the stinger, the degree of divergence that is allowed being set by the spacing of the guide rollers 88.

The guide rollers 88 are all described above as upstanding from the ramps 69 and 81. It should be understood that the axes of rotation of the rollers will each lie in a respective vertical plane and extend approximately perpendicular to the ramp on which they are mounted and approximately perpendicular to the path of the pipeline, but, because, in use, the ramps are inclined to the horizontal, the axes of the rollers will not be vertical and, indeed, when the stinger is arranged for laying a pipeline in deep water, the axes of the rollers may be inclined at less than 45 degrees to the horizontal.

A final pair of upstanding, rotatable guide rollers 90 are mounted at the downstream end of the ramp 81 for rotation about fixed axes in the region of the lateral extremities of the ramp 81.

In addition to the lateral guide rollers described above the stinger is provided with guide rollers for supporting the pipeline from below as it passes along the stinger. On the ramp 69 such guide roller assemblies 95 are provided and on the ramp 81, guide roller assemblies 96 are provided. It can be seen that the guide rollers of the assemblies 95 and 96 are rotatable about horizontal axes and therefore offer no resistance to lateral movement of the pipeline P as it passes over the end of the ramp 69 and the ramp 81.

As should now be understood, the lateral guide roller assemblies can be set so that the pipeline P is guided over the ramps 69 and 81 along the centreline of the stinger, as is conventional practice. They can, however, also be set to allow the pipeline P to curve away from the centreline of the stinger as it passes along the downstream portion of the ramp 69 and along the length of the ramp 81; such curving is shown in FIG. 5. In a particular embodiment of the invention the pipeline may curve away from the centreline with a radius of curvature of about 300 m and that may cause the pipeline to leave the downstream end of the ramp 81 with the central axis of the pipeline offset by about 2 m from the centreline of the stinger and at an angle in the range of 10 to 20 degrees to the centreline of the stinger.

The stinger described above can be used to lay pipe in a conventional manner with the longitudinal axis of the vessel and stinger aligned with the path along which the pipeline is to be laid. In this case the lateral guide rollers are of reduced significance and are preferably set to guide the pipeline along the centreline of the stinger, which should in any case be the natural path for the pipeline to follow.

Figure 7:
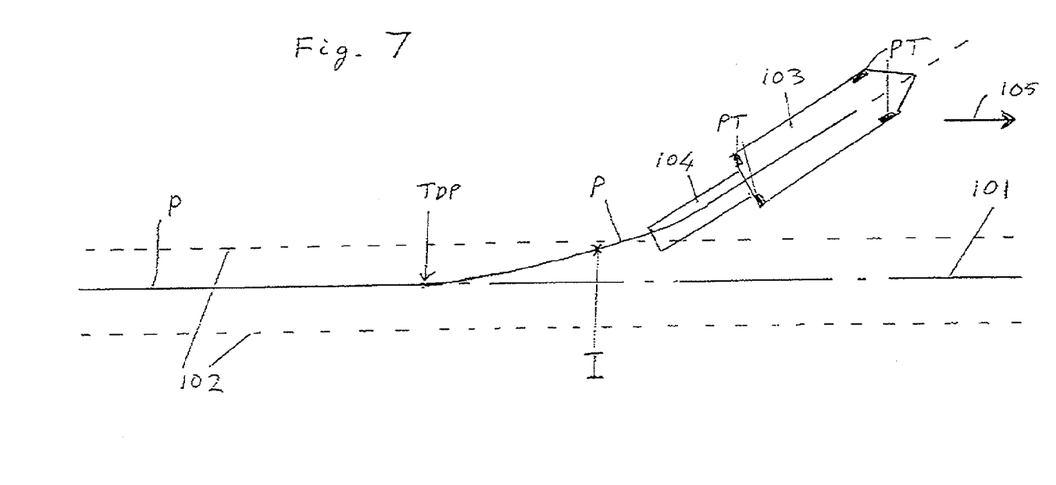
FIG. 7 is a diagrammatic view of the vessel incorporating the stinger of FIGS. 3 to 6 when it is weathervaning.

The stinger can however also be used for laying pipeline while the vessel is weathervaning. An example of this is shown schematically in FIG. 7. The planned pipelaying path of the vessel is indicated by a chain dotted line 101 in FIG. 7 and the borderlines of the permitted region of pipelaying (the laying corridor) is shown by dotted lines 102. The vessel 103 is indicated schematically and is shown with a stinger 104. As can be seen, the vessel is orientated at an angle of more than 40 degrees (the weathervaning angle) to the planned pipelaying path, enabling the vessel to face directly into oncoming waves. The vessel is, however, driven by propellers/thrusters thrusters PT in the pipelaying direction as indicated by an arrow 105 in FIG. 7. During such pipelaying, the pipeline P passes along a centreline of the upstream portion of the stinger 104 but curves away from the centreline of the stinger towards the direction of the pipelaying path on the seabed. Consequently the pipeline P leaves the stinger at an angle, and is offset by 2 m from the centreline of the stinger. The pipeline P continues to curve, as viewed from above, until it reaches the touchdown point TDP on the seabed where it has become aligned with the pipelaying path 101.

Viewed from the side, the path of the pipeline on the vessel 103 is substantially horizontal and then becomes more downwardly inclined as it travels along the stinger 104. Immediately after leaving the stinger the pipeline becomes even more steeply inclined but thereafter reduces in inclination and becomes horizontal once it reaches the touch down point TDP. The point at which the inclination of the pipeline P to the horizontal is at its greatest is the inflection point of the pipeline and is indicated by the letter I in FIG. 7.

As will now be understood, the curved shape of the pipeline as it travels from the vessel 103 to the touchdown point TDP is somewhat complex, curving in both lateral and vertical planes. Embodiments of the present invention seek to allow a vessel to weathervane whilst smoothing that curvature, minimizing the stresses in the pipeline and continuing to lay the pipeline along its pipelaying path. We have found that in order to do that, it is important that, when the vessel is turned to a position inclined to the pipelaying path, it is rotated about an axis passing at least approximately through the point of inflection T.

Figure 8:
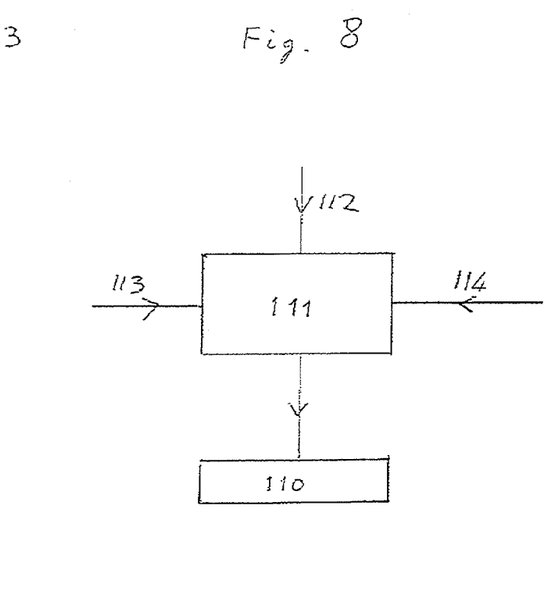
FIG. 8 is a block diagram of the control system for the stinger.

FIG. 8 shows schematically the dynamic positioning control system for the vessel 103. As already described, the dynamic positioning system comprises a plurality of propellers/thrusters PT that are able to drive the vessel along a chosen direction which may be inclined to the longitudinal axis of the vessel and are also able to rotate the vessel about a vertical axis. In the block diagram of FIG. 8 block 110 represents the dynamic positioning system and block 111 represents a computer controlling the system. The computer 111 receives an input 112 indicating the current orientation of the vessel and thus indicating the current angle of inclination of the vessel to the pipelaying path; the computer 111 also receives an input 113 indicating the desired orientation of the vessel, taking account of the current sea conditions; also, the computer receives an input 114 indicating the current location of the inflection point I. The location of the inflection point is ascertained by monitoring the actual path of the pipeline as it travels from the vessel to the seabed.

If the computer 111 determines that the angle of inclination of the vessel to the pipelaying path 101 should be changed then it controls the dynamic positioning system 110 of the vessel to rotate the vessel about a vertical axis passing through the inflection point I. That results in the pipeline P continuing to be laid along the pipelaying path 101, even though the vessel itself may lie entirely outside the laying corridor, as is the case in the arrangement shown in FIG. 7.

As described above, the stinger may be employed with the ramp 81 in an active position as shown in FIG. 4 or a passive position as shown in FIG. 3. As already indicated the passive position shown in FIG. 3 is especially suited to laying in shallow water. In a case where the ramp 81 would otherwise be in a passive position, but it is desired to weathervane, it is possible to pivot the ramp 81 upwardly from its passive position shown in FIG. 3 to its active position. A controlled degree of lateral curvature can then be introduced into the pipeline as it leaves the stinger.

Whilst the present invention has been described and illustrated with reference to a particular embodiment, it will be appreciated by those of ordinary skill in the art that the invention lends itself to many different variations not specifically illustrated herein.

For example, the embodiment described above employs a stinger having one more ramp (the ramp 81) than the stinger shown in WO 2011/086100, but it should be understood that the stinger could have fewer ramps or more ramps.

In the control system shown in FIG. 8, the position of the inflection point I is determined by monitoring the actual path of the pipeline but it should be understood that an alternative option is to calculate the path of the pipeline and therefore the position of the inflection point I from other data such as the angle of inclination of the pipeline as it leaves the stinger, the tension in the pipeline, the water depth and the characteristics of the pipeline.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of S-laying a pipeline from a vessel in which a stinger extends away from an end of the vessel and the pipeline passes over the stinger as it is laid from the vessel, the inclination of the pipeline to the horizontal increasing as it passes along the stinger and after it leaves the stinger until it reaches an inflection point beyond the end of the stinger at which the inclination of the pipeline to the horizontal is at a maximum, the inclination of the pipeline thereafter reducing until it touches down on the seabed, the method including the following steps:
   providing guides on the stinger that limit lateral movement of the pipeline relative to the stinger,
   moving the vessel and the stinger during S-laying to an orientation in which the longitudinal axis of the stinger is inclined to the path of the pipeline just laid on the seabed,
   wherein the step of moving the vessel and the stinger comprises rotating the vessel and the stinger about a vertical axis that is located beyond the end of the stinger and passes substantially through the inflection point.

2. A method according to claim 1, in which, as viewed from above, the orientation of the stinger relative to the vessel in the region of the connection of the stinger to the vessel is fixed.

3. A method according to claim 1, in which the inclination of the stinger relative to the vessel in the region of the connection of the stinger to the vessel is adjustable.

4. A method according to claim 1, in which the stinger comprises a series of sections pivotally connected to one another, the sections being pivotable about a horizontal axis but fixed against pivoting about a vertical axis.

5. A method according to claim 1, in which a downstream end portion of the stinger is able to be moved between an active position in which it guides the pipeline and a passive position in which it does not interact with the pipeline.

6. A method according to claim 1, in which the vessel and the stinger are moved to an orientation in which the longitudinal axis of the stinger is inclined to the path of the pipeline just laid on the seabed at an angle of more than 20 degrees.

7. A method according to claim 6, wherein the method comprises touching down the pipeline within a laying corridor, and in which the vertical axis about which the vessel and the stinger are rotated stays within the laying corridor.

8. A method according to claim 6, wherein the method comprises touching down the pipeline within a laying corridor, and in which the distal end of the stinger stays within the laying corridor.

9. A method according to claim 1, in which the vessel and the stinger are moved to an orientation in which the longitudinal axis of the stinger is inclined to the path of the pipeline just laid on the seabed at an angle of more than 20 degrees.

10. A method according to claim 1, in which each guide for limiting lateral movement of the pipeline extends on one side or another of the pipeline and defines a lateral guide.

11. A method according to claim 10, in which each lateral guide comprises a roller mounted for rotation about an axis disposed in a respective vertical plane and substantially perpendicular to the pipelaying path in the vicinity of the roller.

12. A method according to claim 11, in which the axis of rotation of the roller is fixed during laying of the pipeline, but can be adjusted laterally prior to laying of the pipeline.

13. A method according to claim 1, in which the lateral guides are in a series of pairs along the stinger, at least some of the pairs of guides being laterally spaced apart by a distance greater than the diameter of the pipeline with the lateral spacing increasing towards the downstream end of the stinger.

14. A method according to claim 1, in which, as viewed from above, the pipeline curves as it passes along the stinger and leaves the stinger at an inclination to the longitudinal axis of a downstream end portion of the stinger and at a position offset from the central portion of the downstream end portion of the stinger.

15. A method according to claim 1, in which, as the pipeline passes along the stinger, its downward and lateral movement are limited by the stinger but it is not restrained by the stinger from moving upwardly relative to the stinger.

16. A pipelaying vessel assembly for S-laying a pipeline, the assembly comprising:
   a vessel;
   a stinger extending away from an end of the vessel for guiding the pipeline as it is laid from the vessel, the stinger being arranged to define a pipelaying path that increases in inclination to the horizontal towards its downstream end but which does not reach a vertical orientation, such that when, in use, a pipeline is laid from the vessel, the inclination of the pipeline to the horizontal increases as it passes along the stinger and after it leaves the stinger until it reaches an inflection point beyond the end of the stinger at which the inclination of the pipeline to the horizontal is at a maximum, the inclination of the pipeline thereafter reducing until it touches down on the seabed;
   lateral guides on the stinger for limiting lateral movement of the pipeline relative to the stinger;
   a propulsion system configured to propel the vessel in a desired direction of translational and rotational movement; and
   a control system capable of detecting or calculating the inflection point of the pipeline and for moving the vessel and the stinger during S-laying to an orientation in which the longitudinal axis of the stinger is inclined to the path of the pipeline just laid on the seabed, wherein the control system is arranged to effect the movement by rotating the vessel and the stinger about a vertical axis that, while the vessel is rotating, is located beyond the end of the stinger and passes substantially through the inflection point.

17. A pipelaying vessel assembly according to claim 16, in which the stinger comprises a series of sections that are pivotally adjustable relative to one another about a horizontal axis to alter the overall downward inclination of the stinger along its length but are fixed against pivotal movement about an axis in a vertical plane and perpendicular to the path of the pipeline in that region of the stinger.

18. A method of laying a pipeline employing a pipelaying vessel assembly according to claim 16.

19. A pipelaying vessel assembly for S-laying a pipeline, the assembly comprising
   a vessel;
   a stinger extending away from an end of the vessel for guiding the pipeline as it is laid from the vessel, the stinger being arranged to define a pipelaying path that increases in inclination to the horizontal towards its downstream end but which does not reach a vertical orientation, such that when, in use, the pipeline is laid from the vessel, the inclination of the pipeline to the horizontal increases as it passes along the stinger, the stinger comprising a series of sections that are pivotally adjustable relative to one another about a horizontal axis to alter the overall downward inclination of the stinger along its length but are fixed against pivotal movement about an axis in a vertical plane and perpendicular to the path of the pipeline in that region of the stinger;

lateral guides on one or more sections of the stinger for limiting lateral movement of the pipeline relative to the stinger but allowing the pipeline to move to a position on the stinger laterally offset from a central portion of the stinger, wherein the lateral guides are in a series of pairs along the stinger, at least some of the pairs of guides being laterally spaced apart by a distance greater than the diameter of the pipeline with the lateral spacing increasing towards the downstream end of the stinger; and a propulsion system configured to propel the vessel in a direction inclined to the longitudinal axis of the vessel during S-laying of the pipeline.

20. A pipelaying vessel assembly according to claim 19, in which the stinger comprises three or more sections pivotally connected in series for rotation about respective horizontal axes.

21. A pipelaying vessel assembly according to claim 19, in which a first set of the lateral guides are arranged to retain the pipeline in a central portion of the stinger along an upstream portion of the stinger and a further set of the lateral guides are arranged to allow the pipeline to move to a position on the stinger laterally offset from the central portion of the stinger along a downstream portion of the stinger.

22. A pipelaying vessel assembly according to claim 19, in which each lateral guide comprises a roller mounted for rotation about an axis disposed in a respective vertical plane and substantially perpendicular to the pipelaying path in the vicinity of the roller.

23. A pipelaying vessel assembly according to claim 22, in which the axis of rotation of the roller is fixed during laying of the pipeline, but can be adjusted laterally prior to laying of the pipeline.

24. A pipelaying vessel assembly according to claim 19, in which the stinger is open on its upper side, such that, in use, the pipeline is free to move, relative to the stinger, upwardly away from the stinger.

* * * * *